UNITED STATES PATENT OFFICE.

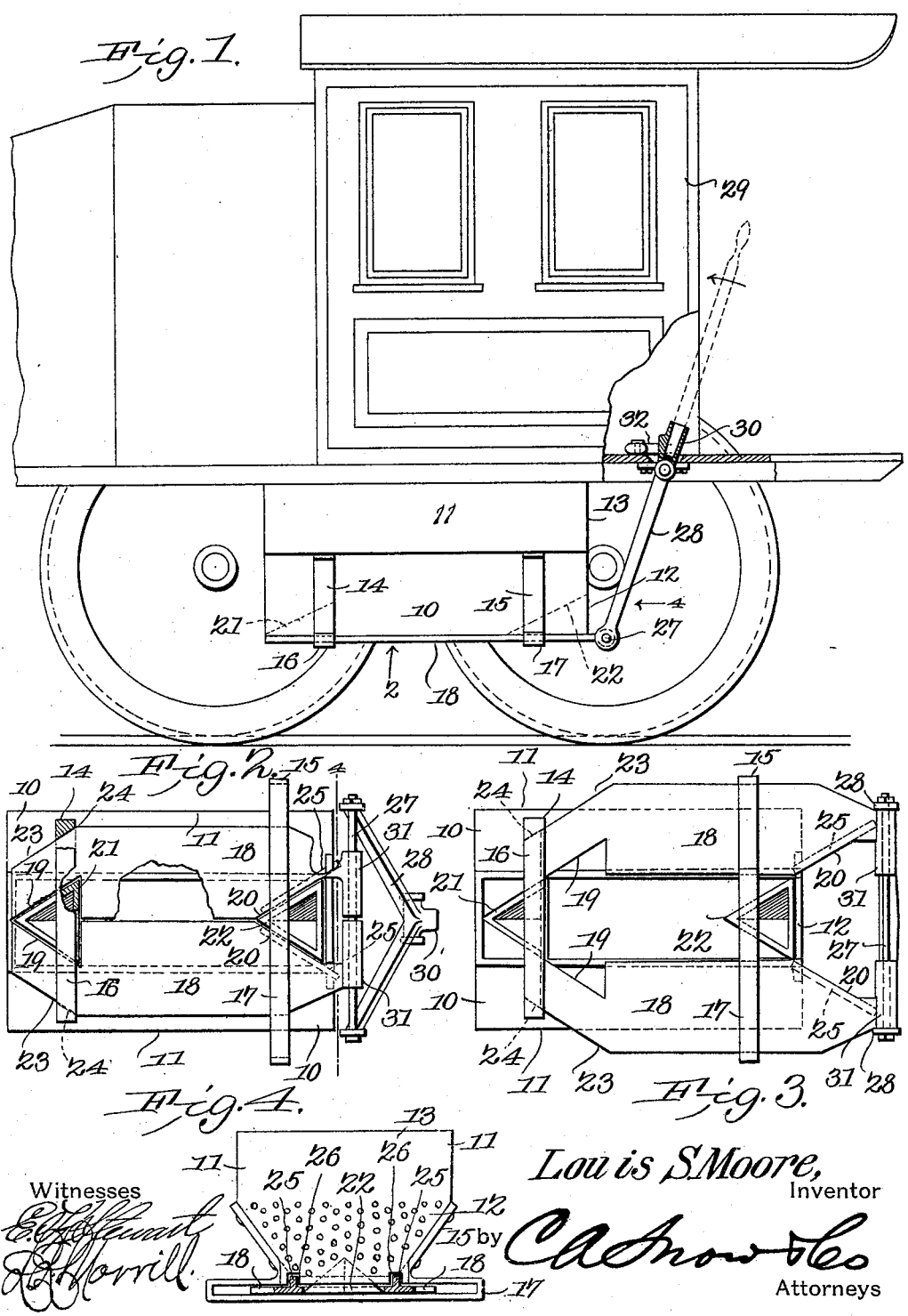

LOUIS S. MOORE, OF SELMA, ALABAMA.

ASH-PAN FOR LOCOMOTIVES.

No. 819,364.  Specification of Letters Patent.  Patented May 1, 1906.

Application filed August 14, 1905. Serial No. 274,170.

*To all whom it may concern:*

Be it known that I, LOUIS S. MOORE, a citizen of the United States, residing at Selma, in the county of Dallas and State of Alabama, have invented a new and useful Ash-Pan for Locomotives, of which the following is a specification.

This invention relates to pans for locomotives, and has for its object to provide an ash-pan embodying practical means whereby the ashes may be dumped from the pan without the necessity of an operator going beneath the locomotive or even while the locomotive is in motion.

A further object of the invention is to provide an ash-pan having plates covering the bottom which may be moved laterally and simultaneously to open the bottom of the pan and permit the ashes to fall therefrom.

A further object of the invention is to provide an ash-pan having plates covering the bottom and a lever mounted in the cab for moving the plates longitudinally and cams or deflectors carried by the pan in positions to engage cam-surfaces on the plates to open and close the plates laterally.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a view in side elevation of a portion of a locomotive with the improved ash-pan applied thereto. Fig. 2 is a bottom plan view of the improved ash-pan closed with parts broken away to show the construction more clearly. Fig. 3 is a bottom plan view of the improved ash-pan open. Fig. 4 is a section on line 4 4 of Fig. 2.

Like characters of reference indicate corresponding parts in all of the figures of the drawings.

In its preferred embodiment the improved ash-pan forming the subject-matter of this application comprises inclined sides 10, forming a continuation of the sides 11 of the fire-box. The rear end 12 of the pan is perforated to form draft-openings and is located substantially in a plane with the rear end 13 of the fire-box. To the sides of the ash-pan are secured supporting-brackets 14 and 15, provided, respectively, with horizontally and transversely disposed rails 16 and 17. Upon the rails 16 and 17 are mounted the plates 18, each having the angularly-disposed cam-surfaces 19 and 20 engaging wedge-shaped cams or deflectors 21 and 22, carried rigidly by the pan and upon the rails 16 and 17. The plates are also provided with outer cam-surfaces 23, which bear upon beveled portions of the bracket 14. Upturned flanges 25 are disposed along the cam-surfaces 20 and travel within notches 26 in the lower edge of the rear plate 12 of the pan. Transversely and in the rear of the pan is mounted the bar 27, connected to the bifurcated lever 28, which extends upwardly within the cab 29 of the locomotive and is provided with a socket 30, into which a lever extension may be inserted. The plates 18 are provided at their rear ends with sleeves 31, embracing and slidably movable upon the bar 27. Within the cab may be mounted any approved form of pawl, as 32, to hold the plates 18 in a closed position, as shown in Figs. 1 and 2.

With the parts disposed as shown in Figs. 1 and 2 the plates may be opened and the ashes dumped by inserting a removable lever into socket 30, disengaging the pawl 32 and moving the lever forward in the direction indicated by the arrow. The movement of the lever will draw the plates 18 rearwardly, and by reason of the cam-surfaces 19 and 20 engaging the wedge-shaped cams 21 and 22 the plates are spread apart and the bottom of the pan opened, as shown in Fig. 3. On account of the pyramidal formation of the cams 21 and 22 the contained ashes will slide freely therefrom, and the pan thus be entirely emptied. When the ashes have fallen from the pan, a backward movement of the lever will move the plates forward, and the cam-surfaces 23, contacting with the surfaces 24 and the flanges 25 within the notches 26, will guide the plates toward each other to close the pan.

Having thus described the invention, what is claimed is—

1. An ash-pan having an outlet in the bottom thereof, deflecting devices fixedly mounted within the pan, closures for said outlet, and means for sliding the closures against the deflectors to move said closures apart.

2. An ash-pan having an outlet in the bottom thereof, deflectors fixedly mounted within the outlet, oppositely-disposed closures having cam edges for contacting with the deflectors, and means for sliding the closures against opposite faces of the deflectors to spread said closures apart.

3. An ash-pan having an outlet, wedge-like deflectors fixedly mounted in the outlet, closures slidably mounted to close the outlet and having angular recesses normally embracing the deflectors, and means for sliding the plates against the deflectors to spread said closures apart.

4. An ash-pan having an outlet, supporting-rails thereunder, oppositely-disposed closure-plates slidably mounted on the rails, means for moving the plates longitudinally, and fixed devices interposed between the plates for deflecting them laterally during their longitudinal movement.

5. An ash-pan having an outlet, supporting-rails thereunder, oppositely-disposed closure-plates mounted upon the rails, means for sliding the plates longitudinally upon the rails, and fixed devices secured to the rails and between and projecting into the plates for deflecting said plates laterally during their longitudinal movement.

6. An ash-pan having an outlet, supporting-rails thereunder, a rod, closure-plates upon the rails and slidably connected at one end to the rod, means for shifting the rod to slide the plates longitudinally and deflectors interposed between and projecting into the plates to slide the plates upon the rod in opposite directions during their longitudinal movement.

7. An ash-pan having an outlet, supports thereunder, closure-plates upon the supports, means for simultaneously sliding the plates longitudinally, wedge-like deflectors fixedly secured to the rails and between the plates to deflect said plates apart during their longitudinal movement in one direction and means adjacent the outer edges of the plates for directing said plates into closed position while they are moving in the other direction.

In testimony that I claim the foregoing as my own I have hereto affixed my signature in the presence of two witnesses.

LOUIS S. MOORE.

Witnesses:
J. E. DAVIDSON,
D. P. O'ROURK.